(12) United States Patent
Gupta et al.

(10) Patent No.: US 9,185,093 B2
(45) Date of Patent: Nov. 10, 2015

(54) SYSTEM AND METHOD FOR CORRELATING NETWORK INFORMATION WITH SUBSCRIBER INFORMATION IN A MOBILE NETWORK ENVIRONMENT

(71) Applicant: McAfee, Inc., Santa Clara, CA (US)

(72) Inventors: Bikram Kumar Gupta, Sunnyvale, CA (US); Sudarshan Swamy, Bangalore (IN); Srikant Vissamsetti, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 29 days.

(21) Appl. No.: 13/731,480

(22) Filed: Dec. 31, 2012

(65) Prior Publication Data

US 2014/0189861 A1 Jul. 3, 2014

(51) Int. Cl.
- *G06F 21/00* (2013.01)
- *H04L 29/06* (2006.01)
- *H04L 29/08* (2006.01)
- *H04L 12/26* (2006.01)

(52) U.S. Cl.
CPC .............. *H04L 63/08* (2013.01); *H04L 67/22* (2013.01); *H04L 67/30* (2013.01); *H04L 43/026* (2013.01); *H04L 43/028* (2013.01); *H04L 63/123* (2013.01); *H04L 63/14* (2013.01)

(58) Field of Classification Search
CPC ....... H04L 63/126; H04L 63/08; H04L 63/14; H04L 63/1416; H04L 63/1408; H04L 43/026; H04L 43/028; H04L 67/30; H04L 67/22
USPC ...................................................... 726/22–24
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 7,631,355 B2 * | 12/2009 | Bolt et al. | 726/23 |
| 7,676,217 B2 | 3/2010 | Zhu et al. | |
| 7,841,008 B1 * | 11/2010 | Cole et al. | 726/25 |
| 7,855,982 B2 | 12/2010 | Ramankutty et al. | |
| 7,954,141 B2 * | 5/2011 | De Lutiis et al. | 726/9 |
| 8,261,093 B1 * | 9/2012 | Dhesi et al. | 713/189 |

(Continued)

FOREIGN PATENT DOCUMENTS

| | | | |
|---|---|---|---|
| WO | WO 0044148 | * | 7/2000 |
| WO | 2014/062629 A1 | | 4/2014 |

(Continued)

OTHER PUBLICATIONS

Computer desktop encyclopedia, "processor", date accessed Jun. 16, 2014 http://lookup.computerlanguage.com/host_app/search?cid=C999999&term=processor&lookup=Go.*

(Continued)

*Primary Examiner* — Jung Kim
*Assistant Examiner* — Carlos M De Jesus Lassaia
(74) *Attorney, Agent, or Firm* — Patent Capital Group

(57) ABSTRACT

A method is provided in one example embodiment and includes receiving information for network traffic in a wireless network; correlating the information with a subscriber of a plurality of subscribers; and generating a behavior profile for the subscriber based on the information over a period of time.

18 Claims, 5 Drawing Sheets

(56) References Cited

U.S. PATENT DOCUMENTS

| | | | |
|---|---|---|---|
| 8,321,504 B2 * | 11/2012 | Goyet et al. | 709/203 |
| 8,321,541 B1 * | 11/2012 | Bennett et al. | 709/222 |
| 2002/0150110 A1 * | 10/2002 | Inbar et al. | 370/401 |
| 2002/0155825 A1 * | 10/2002 | Haumont et al. | 455/412 |
| 2004/0141507 A1 * | 7/2004 | Michel | 370/395.52 |
| 2005/0111453 A1 * | 5/2005 | Mizutani | 370/390 |
| 2006/0156380 A1 * | 7/2006 | Gladstone et al. | 726/1 |
| 2006/0262742 A1 * | 11/2006 | Dommaraju et al. | 370/328 |
| 2006/0282896 A1 * | 12/2006 | Qi | 726/25 |
| 2007/0113269 A1 * | 5/2007 | Zhang | 726/4 |
| 2008/0130623 A1 * | 6/2008 | Skog et al. | 370/349 |
| 2010/0040233 A1 * | 2/2010 | Ganapathy | 380/277 |
| 2010/0162240 A1 * | 6/2010 | Zhang et al. | 718/1 |
| 2010/0268524 A1 * | 10/2010 | Nath et al. | 703/23 |
| 2011/0179484 A1 | 7/2011 | Tuvell et al. | |
| 2011/0211682 A1 * | 9/2011 | Singh et al. | 379/142.05 |
| 2011/0255688 A1 | 10/2011 | Spalink et al. | |
| 2011/0265109 A1 | 10/2011 | Goyet et al. | |
| 2011/0265173 A1 * | 10/2011 | Naaman et al. | 726/8 |
| 2012/0005026 A1 * | 1/2012 | Khan et al. | 705/14.64 |
| 2012/0023562 A1 | 1/2012 | Harp et al. | |
| 2012/0115442 A1 * | 5/2012 | Dadu et al. | 455/411 |
| 2012/0122423 A1 * | 5/2012 | Helmreich | 455/411 |
| 2012/0226554 A1 | 9/2012 | Schmidt et al. | |
| 2012/0233656 A1 * | 9/2012 | Rieschick et al. | 726/1 |
| 2012/0233694 A1 * | 9/2012 | Baliga et al. | 726/23 |
| 2014/0105119 A1 * | 4/2014 | Gupta et al. | 370/329 |

FOREIGN PATENT DOCUMENTS

| | | | |
|---|---|---|---|
| WO | WO 2014062629 | * | 4/2014 |
| WO | 2014/105309 A1 | | 7/2014 |
| WO | WO 2014105309 | * | 7/2014 |

OTHER PUBLICATIONS

U.S. Appl. No. 13/652,923, filed Oct. 16, 2012, entitled "System and Method for Correlating Security Events With Subscriber Information in a Mobile Network Environment," Inventor(s) Bikram Kumar Gupta, et al.

International Search Report and Written Opinion in International Application No. PCT/US2013/071335, mailed Feb. 27, 2014, 8 pages.

International Search Report and Written Opinion in International Application No. PCT/US2013/064968, mailed Jan. 24, 2014, 11 pages.

International Preliminary Report on Patentability in International Application No. PCT/US2013/064968, mailed on Apr. 21, 2015, 6 pages.

USPTO Nov. 7, 2014 Nonfinal Rejection in U.S. Appl. No. 13/652,923, 13 pages.

USPTO May 22, 2015 Notice of Allowance in U.S. Appl. No. 13/652,923, 6 pages.

International Preliminary Report on Patentability in International Application No. PCT/US2013/071335, mailed Jul. 9, 2015, 7 pages.

* cited by examiner

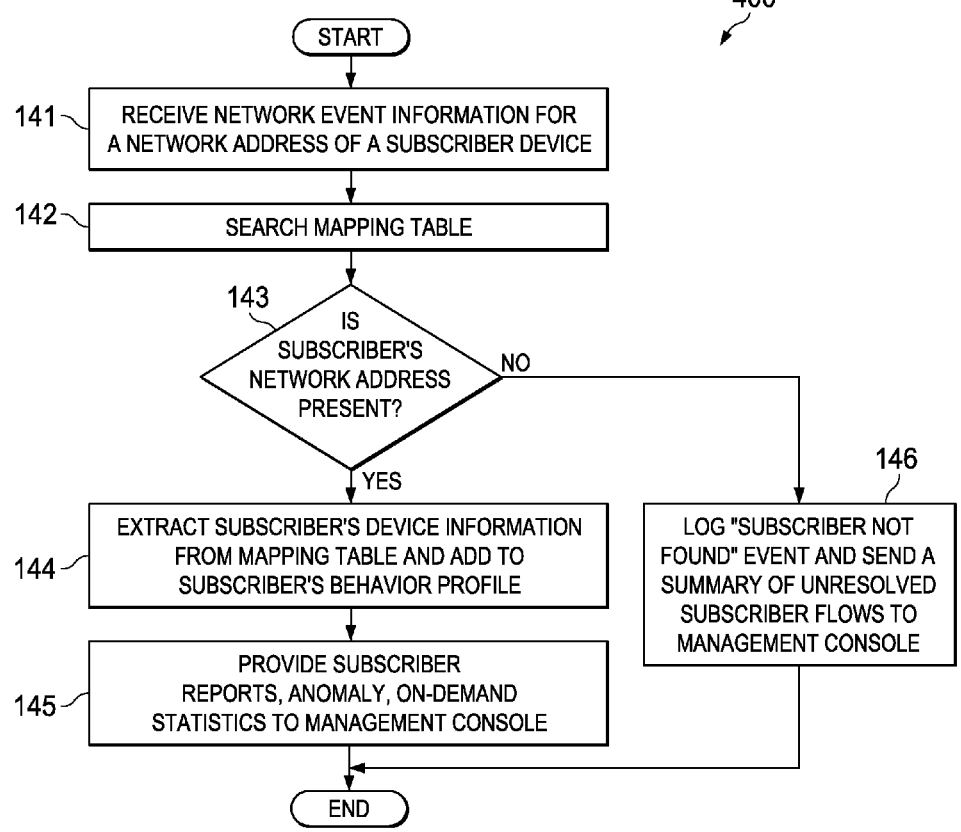
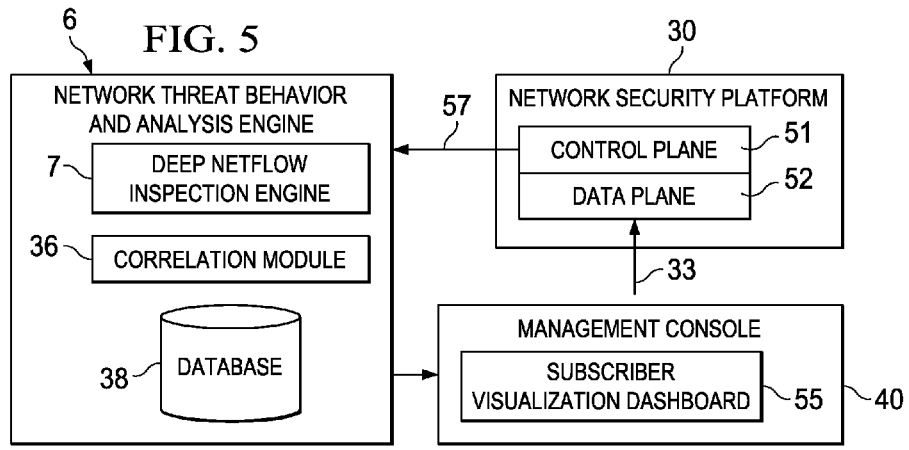

SYSTEM AND METHOD FOR CORRELATING NETWORK INFORMATION WITH SUBSCRIBER INFORMATION IN A MOBILE NETWORK ENVIRONMENT

CROSS-REFERENCE TO RELATED APPLICATIONS

The present application is related to commonly assigned U.S. patent application Ser. No. 13/652,923 filed Oct. 16, 2012.

TECHNICAL FIELD

This disclosure relates in general to the field of mobile networks, and more particularly, to correlating network events with subscriber information in a mobile network environment.

BACKGROUND

Advances in hardware and communication technologies have resulted in the proliferation of mobile devices and mobile network environments all over the world. Today's mobile devices are powerful computing systems that operate on various platforms and have the ability to provide users with network access connectivity and access to needed resources, even when in transit. As mobile devices have soared in popularity, malicious software ("malware") targeting mobile devices has also increased. Until recently, network security solutions have been largely focused on traditional computer networks and the protection of network elements and network endpoints in those networks. With the rise of mobile malware in wireless networks and the extraordinary expansion of mobile devices, however, it has become critical to the security of mobile devices and mobile networks, to apply tailored mobile security solutions in wireless operator networks.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4 is a simplified flowchart illustrating additional potential operations that may be associated with the communication system in accordance with an embodiment;

FIG. 5 is a simplified block diagram illustrating additional details associated with an example network threat behavior analysis engine and management console in accordance with an embodiment.

DETAILED DESCRIPTION OF EXAMPLE EMBODIMENTS

Overview

A method is provided in one example embodiment and includes receiving information for network traffic in a wireless network; correlating the information with a subscriber of a plurality of subscribers; and generating a behavior profile for the subscriber based on the information over a period of time In specific embodiments, the subscriber device information includes at least one of an International Mobile Equipment Identity (IMEI), an International Mobile Subscriber Identity (IMSI), a Mobile Station International Subscriber Directory Number (MSISDN), and an access point name (APN). In more specific embodiments the mapping includes storing the network address and the subscriber device information in a mapping table. In even more specific embodiments, the method includes receiving a subscriber accounting stop packet, identifying a network address in the accounting stop packet, searching the mapping table for a stored network address corresponding to the network address of the accounting stop packet, and deleting the stored network address from the mapping table.

Example Embodiments

Figure 1:
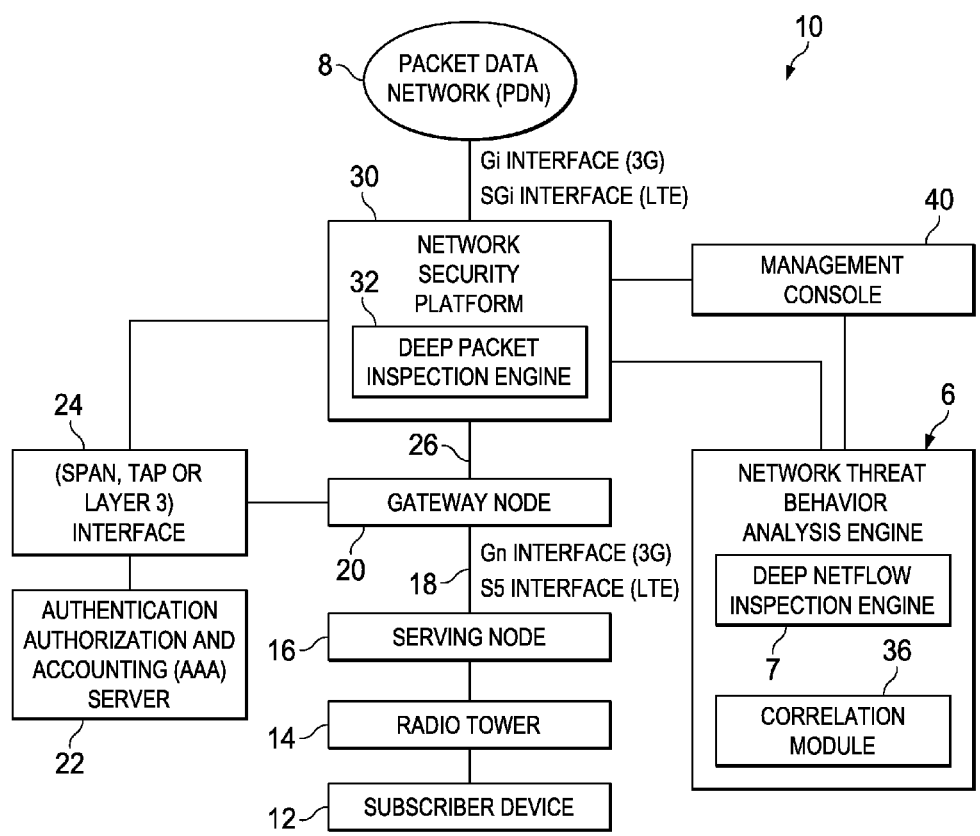
FIG. 1 is a simplified block diagram of a communication system for correlating network events with subscriber information in a mobile network environment in accordance with an embodiment of the present disclosure.

Turning to FIG. 1, FIG. 1 is a simplified block diagram of a communication system 10 for correlating network events with subscriber information in a mobile network environment. FIG. 1 includes an example subscriber device 12 connected to a radio tower 14, which enables communications between subscriber device 12 and other subscriber devices and networks, such as a packet data network (PDN) 8. Subscriber device 12 may be referred to as "subscriber", "mobile device", and/or "device." A user that is using subscriber device 12, may be referred to as a "subscriber user." A mobile service provider's core network in communication system 10 can include a serving node 16, a gateway node 20, and a connection interface 18 between serving node 16 and gateway node 20. In addition, the core network may include an Authentication, Authorization, and Accounting (AAA) server 22, a network security platform 30, and an interface 24 between AAA server 22 and network security platform 30, for receiving accounting packets with subscriber device information. The core network may also include a connection interface 26 that couples gateway node 20 to packet data network 8. Network security platform 30 may also be configured to communicate with a management console 40 and a network threat behavior analysis engine (NTBA) engine 6. Network threat behavior analysis engine 6 can be configured with a deep Netflow inspection engine 7 and a correlation module 36. Network threat behavior analysis engine 6 may also be configured to communicate with management console 40. PDN 8 can include public networks (e.g., the Internet) and/or private networks (e.g., a private corporate network) that communicate by sending and receiving data in packets.

Elements of FIG. 1 may be coupled to one another through one or more interfaces employing any suitable connection (wired or wireless), which provide viable pathways for electronic communications. Additionally, any one or more of these elements of FIG. 1 may be combined or removed from the architecture based on particular configuration needs.

Generally, communication system 10 may be implemented in any suitable type or topology of network (e.g., Intranet, Extranet, LAN, WAN, WLAN, MAN, VLAN, VPN, cellular network, etc.) or suitable combinations thereof, including wired and/or wireless communication. In communication system 10, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 10. Suitable interfaces and infrastructure may be provided to enable communication between the cellular network and the packet data networks.

A packet is a unit of data that can be routed between an origin and a destination on a packet-switched network, such as packet data network 8 or a packet-switched domain of a mobile service provider's core network. A packet includes a source network address and a destination network address. These network addresses can be Internet Protocol (IP) addresses in a TCP/IP messaging protocol. The term 'data' as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

For purposes of illustrating certain example techniques of communication system 10, it is important to understand the communications that may be traversing the mobile network environment. The following foundational information may be viewed as a basis from which the present disclosure may be properly explained.

A mobile phone is a mobile electronic device that can make and receive telephone calls over a radio link, by connecting to a cellular network provided by a mobile service provider. A smartphone is a mobile phone built on a mobile operating system, with advanced computing capability and network access capability. Mobile service providers also offer packet-switched networks for handling mobile data sent and received by smartphones.

With the rapid increase in the wireless (3G/4G) subscribers and Internet access, telecom operators may desire to profile the network traffic of a subscriber without intruding into the privacy of the subscriber. Embodiments of this disclosure describe a wireless network that is configured to learn network behavior of a subscriber using deep packet inspection. A framework for network behavior of the subscriber and risk profiling in 3G/4G networks is provided in one or more embodiments. To perform these functions, the wireless network employs a network security platform and a network threat behavior analysis engine. The network threat behavior analysis engine may also be referred to as a network threat behavior analysis module.

Mobile service providers provide wireless communications services, including radio communications and packet-switched network communications to subscriber devices. A 'subscriber device,' as used herein, is intended to refer to a smartphone or any other wireless device configured to send data to and receive data from a packet data network via a cellular network (e.g., 3G, 4G-LTE, etc.). Mobile service providers typically offer core networks with a packet-switched domain configured to receive radio signal communications from a subscriber device, convert the radio signals to data packets, and send the data packets to a destination node via a packet data network. The packet-switched domain of a core network can also be configured to receive data packets from a node on a packet data network, convert the data packets to radio signals, and send the radio signals to a subscriber device.

With reference to FIG. 1, a packet-switched domain of a mobile service provider's core network generally includes serving node 16, gateway node 20, connection interface 18 between serving node 16 and gateway node 20, and connection interface 26 between gateway node 20 and packet data network 8. The serving node is capable of communicating via radio signals on one end and capable of communicating via packet data (e.g., Internet Protocol) at another end over connection interface 18 to the gateway node. The gateway node is capable of communicating via packet data over connection interface 26 to a packet data network, such as the Internet.

One example core network may include Universal Mobile Telecommunications Service (UMTS), which is a packet-based wireless communication service enabling continuous connection to the Internet for 3G wireless connection. In this service, with reference to FIG. 1, serving node 16 is referred to as a Serving GPRS Support Node (SGSN), and gateway node 20 is referred to as a Gateway GPRS Support Node (GGSN). A 'Gn interface' is connection interface 18 between the SGSN and the GGSN. A 'Gi interface' is connection interface 26 between the GGSN and a destination network such as the Internet or other public or private packet data network.

Another example core network may be configured for 4G Long Term Evolution (LTE) wireless communication standard. In this core network, with reference again to FIG. 1, serving node 16 is referred to as a Serving Gateway (S-GW), and gateway node 20 is referred to as a PDN Gateway (P-GW). An 'S5 interface' is connection interface 18 between the S-GW and the P-GW. An 'SGi interface' is connection interface 26 between the P-GW and a destination network such as the Internet or other public or private packet data network.

In yet another example, a core network may be configured for CDMA2000 standards. In this scenario, gateway node 20 of FIG. 1 is referred to as a packet data serving node (PDSN). PDSN may perform the functions of both serving node 16 and gateway node 20.

Mobile phones can have several unique identifiers. An International Mobile Equipment Identity (IMEI) uniquely identifies a mobile phone internationally and is generally allocated by the equipment manufacturer. An International Mobile Subscriber Identity (IMSI) is a unique number allocated to each mobile subscriber in a mobile communication network (e.g., Global System for Mobile Communications (GSM)) that identifies the subscriber and his or her subscription with the network. An IMSI can be stored in a subscriber identity module (SIM) of mobile phones. Some phones, however, are not configured to use SIMs. A unique Mobile Station International Subscriber Directory Number (MSISDN) is a mobile telephone number used to identify a mobile phone internationally and is used to make and receive calls on the mobile phone.

An access point name (APN) is a network identifier used by a mobile phone when connecting to a core network of a mobile service provider. The mobile service provider can examine the access point name to determine a type of network connection to be created (e.g., Internet Protocol (IP) addresses to be assigned to the mobile phone) and a type of security to be used. The APN can also identify a packet data network to which the mobile phone can communicate.

A mobile service provider may have one or more central databases that contain details of each mobile phone that is authorized on the core network of the mobile service provider. A Home Location Register (HLR) record can store details of SIM cards issued by the mobile service provider, including the IMSI and the MSISDN.

Mobile service providers can provide wireless communication services to millions of customers having subscriber devices. The increase in threats in wireless networks generally, combined with the number of subscriber devices at risk from those threats, necessitates deployment of network security solutions to prevent malware infections. For example, deep packet inspection (DPI) solutions are often deployed in a mobile service provider's core networks between a gateway node on the packet-switched network side and a serving node on the radio communications side (e.g., in the Gn or S5 interface). DPI solutions may include, but are not limited to, intrusion prevention systems (IPS), intrusion detection systems (IDS), and next-generation firewalls (NGFWs).

Typically, DPI systems inspect network traffic and display network addresses of the network traffic when a network event is detected. In addition, some DPI systems can also analyze traffic and determine application information associated with a network address (e.g., chat applications, audio and video applications, etc.). In a network using Internet Protocol Suite (TCP/IP), for example, a DPI system may provide IP addresses of traffic flow when a network event is detected.

An IP address identified from a detected network event can enable identification of a network node on a packet data network, or can generally indicate that some subscriber device is associated with the network event. IP addresses alone, without additional identifying information, however, may not enable identification of particular subscriber devices associated with a detected network event. Without the ability to correlate transport layer, application layer, and network layer information with particular subscriber devices, wireless administrators may be limited in their ability to create and report behavioral profiles. Identifying information of particular subscriber devices associated with a network event may be very useful to wireless administrators. For example, MSISDN (telephone number), IMSI (SIM card number), IMEI (equipment number), and APN (access point name) may be desirable and useful information for a wireless administrator of a mobile service provider.

In a configuration in which a network security device is deployed on a Gn or S5 interface of a mobile service provider's core network, mobile telephone numbers may be obtained by adding significant overhead to the network security device. For example, in one scenario, an intrusion prevention system (IPS) may be deployed on the Gn interface. A GPRS Tunneling Protocol (GTP) inspection may be provided to obtain mobile phone information. GTP inspection, however, can add significant overhead to IPS processing on communications from millions of subscriber devices. Therefore, a more efficient approach is needed for obtaining pertinent mobile phone information and correlating it to network events.

A communication system for correlating network events with subscriber information in a mobile network environment, as outlined in FIG. 1 can resolve these issues (and others). In the communication system of FIG. 1, network security platform 30 can receive accounting information for each subscriber device that comes online in the mobile network environment and send the accounting metadata to network threat behavior analysis engine 6 in a flow record (Netflow). The accounting information can be parsed and a mapping table created. The mapping table can map or otherwise link network addresses assigned to subscriber devices to mobile telephone numbers assigned to the subscriber devices. Network addresses can also be mapped or otherwise linked to other subscriber device information. Network threat behavior analysis engine 6 can monitor network flow records along with application metadata, from or to subscriber devices, for any indications of a network event (e.g., accessing a website, using an application, streaming data for voice or video, connecting to the network). If a network event is detected, the network event can be correlated to the appropriate subscriber device, using the network address associated with the network event to search the mapping table. The network event information and the correlated subscriber device information (e.g., mobile telephone number and other subscriber device information) can be provided to a management console, which may be accessed by authorized wireless operators. Thus, the mobile telephone number can be derived for a detected network event in a Gi or SGi interface rather than a Gn or S5 interface in a mobile service provider's core network.

Correlated information that includes network event and flow information with a mobile phone number (and other subscriber device information) provides numerous advantages. Access to this correlated information enables a mobile service provider to view a mobile phone number of a subscriber device that is associated with a network event or session. The mobile service provider may take immediate remediation actions, if desired. This information also provides a mobile service provider with more useful information about subscribers in its mobile network by providing drilling down capabilities on detected network events based on mobile phone number, IMEI number, IMSI number, and/or APN number. As a result, patterns, trends, or other correlations between network events and the particular mobile phones associated with the network events can be identified and addressed accordingly. Moreover a mobile service provider may choose to educate subscribers (e.g., users/owners of subscriber devices) on their particular behaviors. Additionally, mobile service providers may generate customer-specific behavior reports and share with customers (e.g., on demand, as part of a monthly bill, etc.) on a regular or opt-in basis.

Some of the behavior profile items may include: identification of malware files including applications downloaded on to the mobile device; characterization of Hypertext Transfer Protocol (htt)p traffic from mobile device, such as URL access patterns, risk, category, and time of access; risk profile of the subscriber or the mobile device based on security events; applications used by the mobile device (Netflix, Facebook chat, Google talk, Salesforce, p2p etc.), with bandwidth consumption; top bandwidth consumers among subscribers; and identifying communications of the mobile device with risky sites.

Operators can use behavior profile items for customizing bundled services, providing security awareness for customers, and/or enabling targeted advertisement campaigns. Moreover operators can bill customers (for example, parents would like to know their children's activity, corporations would like to monitor the corporate phones etc.). Embodiments of this disclosure enable operators to deploy a network framework that in turn can be revenue-generating.

Most prior systems are either deployed using an endpoint agent, or are deployed on the GTP link. Operators have traditionally used an expensive approach to learning customer network behavior, such as by placing an agent on the handset or investing in deep-packet inspection (DPI) products which sit on the network. Placing an agent on the subscriber's phone involves privacy issues. The solutions sitting on packet gateway (like GGSN, P-GW) pose the risk of introducing latency or causing inline performance issues. We describe a framework that is non-intrusive, sits on an IP network, and is not inline.

Turning to the infrastructure of FIG. 1, communication system 10 in accordance with an example embodiment is shown. A mobile service provider's core network in communication system 10 can include serving node 16. Serving node 16 can be a computing system configured to receive radio signals on a radio interface, translate the radio signals to data packets (e.g., IP packets), and communicate the data packets to another node over connection interface 18. Serving node 16 is also configured to receive data packets over connection interface 18, translate the data packets to radio signals, and communicate the radio signals to the appropriate subscriber device via a radio tower. For example, serving node may send and receive signals to subscriber device 12 via radio tower 14.

Gateway node 20 can be a computing system configured to receive and communicate data packets to other nodes in the mobile service provider's core network, in addition to nodes of other networks such as packet data network 8. AAA server 22 can be configured to provide an accounting feed with information related to subscriber devices having a status change (e.g., start connection, stop connection, continue connection) in communication system 10. In an embodiment, AAA server 22 can be configured using Remote Authentication Dial in User Service (RADIUS) networking protocol to authenticate users or devices to the network, to authorize users or devices for certain network resources, and/or to account for usage of the network resources. In other implementations, AAA server 22 can be configured using Diameter networking protocol.

AAA server 22 can receive pertinent phone information, such as MSISDN, IMSI, IMEI, and APN for each subscriber device that comes online (i.e., requests a network address) in communication system 10. AAA server 22 can be configured to provide a network address (e.g., IP address) to a subscriber device that requests one. AAA server 22 can provide an accounting feed to gateway node 20 and network security platform 30. The accounting feed can push subscriber accounting information to gateway node 20 each time a subscriber device comes online in communication system 10.

The particular configurations of components in a mobile service provider's core network may vary depending on the wireless standard that is implemented. For a 3rd Generation standard of mobile communications, serving node 16 can be a serving GPRS support node (SGSN), gateway node 20 could be a gateway GPRS support node (GGSN), connection interface 18 could be a Gn interface, and connection interface 26 could be a Gi interface. For a Long Term Evolution standard (LTE) 4G standard of mobile communications, serving node 16 can be an S-GW, gateway node 20 could be a P-GW, connection interface 18 could be an S5 Interface, and connection interface 26 could be an SGi Interface. The examples provided herein for particular components of a mobile service provider's core network are intended for illustrative purposes and are not intended to be limiting. It will be apparent that the concepts of the present disclosure may be applied to various mobile network environments implementing any number of wireless communication standards.

Network security platform (NSP) 30 can be a computing system configured with deep packet inspection engine 32 to evaluate network data traffic for network events in communication system 10. Deep packet inspection engine 32 could be an IPS, an NGFW, an IDS, or any other suitable network security solution for inspecting data packets. Network security platform (NSP) 30 may be configured with Netflow module 34. Netflow module 34 may be configured to generate Netflow records and metadata related to the network traffic and network events and send them to network threat behavior analysis engine 6. The information in the network traffic may include transport layer information, application layer information, and network layer information. For example, NSP 30 may generate Netflow records, additional application metadata, such as an attack ID, HTTP metadata, SMTP metadata, DNS metadata, etc. NSP 30 may also send RADIUS or DIAMETER accounting metadata, as subscriber device 12 enters and leaves the network. The Netflow record can be sent to network threat behavior analysis engine 6 for every network connection. When the flow content is RADIUS or DIAMETER accounting, then NSP 30 generates a Netflow record with subscriber device 12 information as metadata. The subscriber device 12 information may include APN, IMSI, IMEI, MSISDN, and other such information. NSP 30 sends the netflow record for START and STOP accounting. Network threat behavior analysis engine 6 uses those records to build a subscriber table containing an IP address, MSISDN, IMSI, IMEI, APN, TIME IN, TIME OUT, and other such information.

Network threat behavior analysis engine 6 can be a computing system configured with deep Netflow inspection engine 7. Netflow records could be received from NSP 30. Netflow inspection engine 7 may use a parser module to parse through the Netflow records and extract information such as network event information, RADIUS or DIAMETER information, subscriber device information, and metadata information like URL, File access, e-mail recipients etc. Deep Netflow inspection engine 7 also normalizes the flow records, extracts the application metadata and looks for anomaly patterns in the session. Network threat behavior analysis engine 6 may also include correlation module 36 to correlate network events with subscriber device information and provide the correlated information to management console 40. Network threat behavior analysis engine 6 can store subscriber device information along with network event information in a database and can enable wireless operators to build a behavior profile for the mobile network and subscriber devices.

Management console 40 may be a computing system configured to be used by a user to view any behavior profiles, network event information, and subscriber device information.

Interface device 24 is configured to connect AAA server 22 with network security platform 30 to enable the network traffic between AAA server 22 and gateway node 20 to also flow to network security platform 30. Thus, network security platform 30 receives accounting feeds from AAA server 22 and can parse the accounting packets to extract subscriber device information. In an embodiment, interface device 24 could be layer 3 switch with a SPAN port that provides, to network security platform 30, a copy of data packets that are sent from AAA server 22 to gateway 20. In another embodiment, interface device 24 could be a network TAP in which an access port is set up between a network element (e.g., layer 3 switch) and another network element (e.g., network security platform 30) to allow passive monitoring of network traffic flowing from AAA server 22 to gateway 20. In an embodiment, interface 24 could be integrated with gateway node 20 such that the accounting packets flow from gateway node 20 to network security device 30.

Serving node 16, gateway node 20, AAA server 22, interface 24, network security platform 30, and management console 40 are network elements that facilitate electronic communication with subscriber devices and/or other nodes in a given network (e.g., PDN 8). As used herein, the term 'network element' is meant to encompass computing systems, routers, switches, wireless access points (WAPs), gateways, bridges, loadbalancers, appliances, firewalls, servers, processors, modules, or any other suitable device, component, element, proprietary appliance, or object operable to exchange information in a network environment. A network element may include any suitable hardware, software, components, modules, interfaces, or objects that facilitate the operations thereof. This may be inclusive of appropriate algorithms and communication protocols that allow for the effective exchange of data or information.

Figure 2:
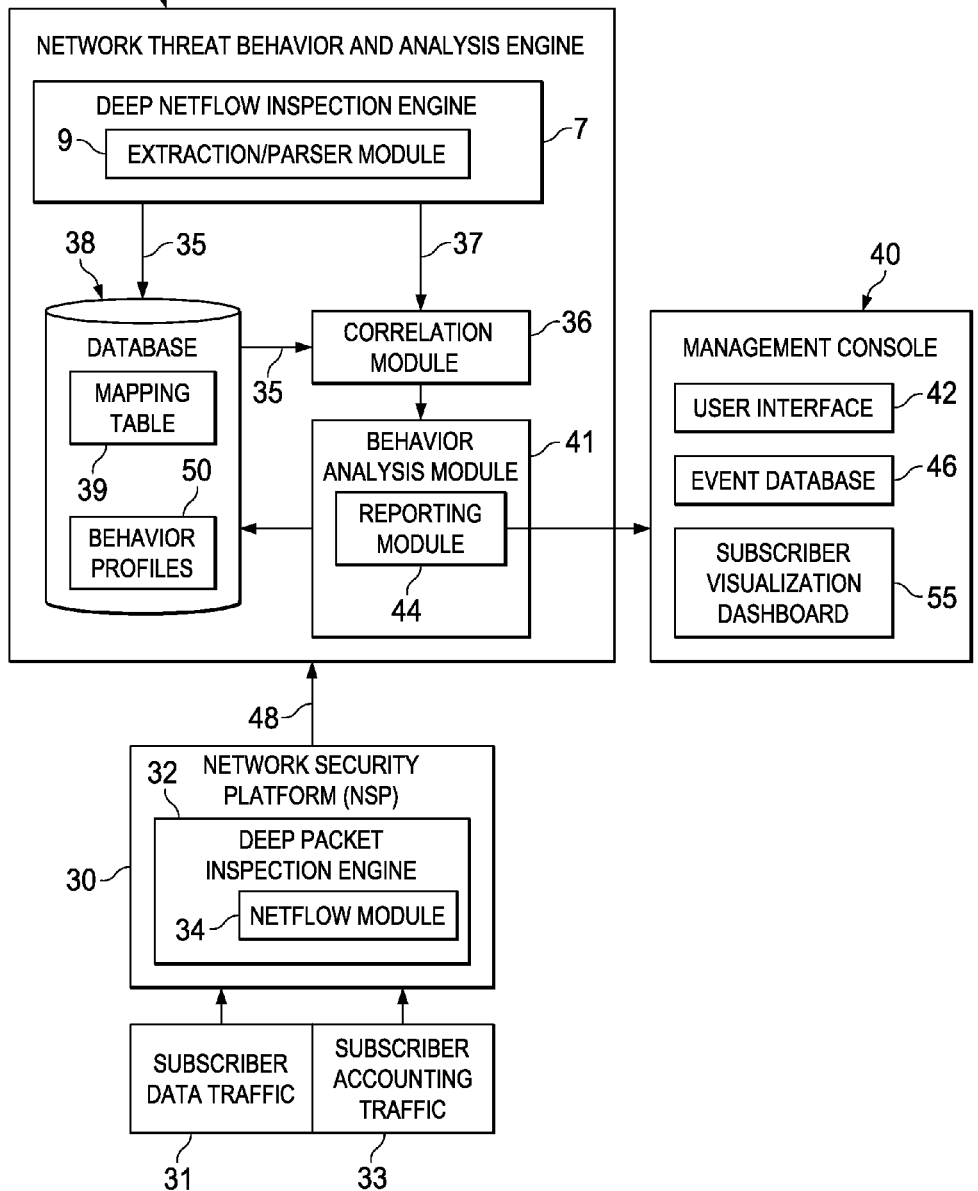
FIG. 2 is a simplified block diagram illustrating an example network threat behavior analysis engine and management console in accordance with an embodiment.

Turning to FIG. 2, FIG. 2 is a block diagram illustrating some possible details associated with network threat behavior analysis engine 6, which performs network data traffic inspection and subscriber accounting information processing. In an embodiment, network security platform 30 can include deep packet inspection engine 32 with a Netflow module 34. Network threat behavior analysis engine 6 may include deep Netflow inspection engine 7 with parser module 9, correlation module 36, a database 38 with a mapping table 39 and behavior profiles 50, and behavior analysis module 41 with a reporting module 44.

Network security platform 30 can receive subscriber accounting traffic 33. In an embodiment, subscriber accounting traffic 33 can include an accounting start packet or an accounting stop packet for a subscriber device. An accounting start or stop packet is received in a data plane from AAA server 22. An accounting start packet indicates the start of a subscriber device's network access and can contain a network address assigned to the subscriber device in addition to subscriber device information. An accounting stop packet indicates the termination of network access by a subscriber device, and can contain the network address of the subscriber device. In some cases, an accounting stop packet may also include subscriber device information. The transmission and reception of subscriber accounting traffic 33 can include any appropriate communication protocol, including TCP/IP communication protocols such as Transmission Control Protocol (TCP), Stream Control Transmission Protocol (SCTP), Internet Protocol version 4 (IPv4), Internet Protocol version 6 (IPv6), etc.

By way of illustration, an accounting start packet can be created by AAA server 22 when subscriber device 12 initiates communication with communication system 10. In an example implementation, AAA server 22 may provide a network address to subscriber device 12. The network address can be an IP address in a TCP/IP messaging protocol. When a network access is granted to subscriber device 12, an accounting start request may be sent to AAA server 22. AAA server 22 can receive subscriber device information from the accounting start request. Subscriber device information can include, but is not limited to, MSISDN (mobile telephone number), IMSI (SIM card number), IMEI (equipment number), and APN (access point name). Other subscriber device information may also be received in the accounting start request, such as subscriber device location. The network address of subscriber device 12 and any or all of the subscriber device information can be included in the accounting start packet created by AAA server 22. In one example embodiment, the accounting start packet can be the same configuration and include the same data as the accounting start request.

An accounting stop packet can be created by AAA server 22 when subscriber device 12 terminates its communication with communication system 10. By way of illustration, when subscriber device 12 terminates its connection to communication system 10, an accounting stop request is sent to AAA server 22. AAA server 22 may receive subscriber device information from the accounting stop request, such as MSISDN, IMSI, IMEI, APN, subscriber device location, etc. The network address of subscriber device 12 and any or all of the subscriber device information can be included in the accounting stop packet. In one example embodiment, the accounting stop packet can be the same configuration and include the same data as the accounting stop request.

Subscriber accounting traffic 33, which includes an accounting stop or start packet, can be pushed from AAA server 22 to gateway node 20 via interface 24. Network security platform 30 can receive subscriber accounting traffic 33 from interface 24 via, for example, a SPAN or TAP configuration. Network security platform 30 then forwards subscriber accounting traffic 33 to network threat behavior analysis engine 6. Deep Netflow inspection engine 7 can include extraction/parser module 9 to distinguish subscriber accounting traffic 33 from subscriber data traffic 31. In an example embodiment, subscriber accounting traffic 31 may not be subjected to a deep packet inspection as it can be assumed to be benign.

If subscriber accounting traffic 33 includes an accounting start packet for subscriber device 12, extraction/parser module 9 parses the accounting start packet and collects the network address of subscriber device 12. Extraction/parser module 9 can also extract subscriber device information such as MSISDN, IMSI, IMEI, and APN, and any other desired information such as subscriber device location. In an embodiment, extraction/parser module 9 can build mapping table 39 with subscriber data 35, which includes the network address of subscriber device 12 and its subscriber device information. Mapping table 39 can be configured such that the network address of subscriber device 12 is mapped to its subscriber device information. Mapping table 39 may be stored in database 38 of network threat behavior analysis engine 6.

In an embodiment, a network address may be 'mapped' or 'linked' to subscriber device information using any suitable technique that results in a relationship between the network address and the subscriber device information in a memory element (e.g., in database 38, in cache memory, etc.). In an embodiment, the relationship may be persistent in data storage such as database 38. In one example implementation, the network address and each item of the subscriber device information can be stored in different columns of the same database record. In another example, the network address can be stored in mapping table 39 and one or more pointers can be provided to indicate the location of the subscriber device information. These examples are provided for illustrative purposes only. Numerous other mapping techniques may be used to map network addresses to subscriber device information, and such techniques are considered to be included within the broad scope of this disclosure.

If subscriber accounting traffic 33 includes an accounting stop packet, extraction/parser module 9 parses the accounting stop packet and collects the network address of subscriber device 12. Extraction/parser module 9 can search mapping table 39 for the network address of subscriber device 12. If the network address is found, then the network address can be deleted from mapping table 39. Therefore, if another subscriber device joins communication system 10 and is assigned the same network address, then a conflict in mapping table 39 is avoided. Subscriber device information that corresponds to the network address may also be deleted from mapping table 39.

Network security platform 30 can also receive subscriber data traffic 31. Subscriber data traffic may contain data packets that are being sent to or from subscriber device 12. A subscriber data packet can be examined by deep packet inspection engine 32 to identify any network events. A network event can include malicious software ("malware"), unauthorized software (although potentially not malicious), SPAM messages, data leakage, or any other unauthorized activities. The term "malware" is commonly used as a label for any hostile, intrusive, or annoying software such as a computer virus, spyware, adware, botnet, etc., but generally includes any software designed to interfere with the normal operation of a computer or network through unauthorized access, destruction, disclosure, modification of data, and/or denial of service.

If deep Netflow inspection engine 7 detects a network event in Netflow records or metadata, then network event data 37 may be provided to correlation module 36 using Netflow. In an embodiment, a network address associated with subscriber data traffic 31 could be a source or destination IP address of the subscriber data traffic. In one embodiment, both the source and the destination network address are provided in network event data 37 with the network event information. Network event information may include, but is not limited to, an identifier of the detected network event.

Correlation module 36 correlates the subscriber device information for subscriber device 12 with the Netflow for subscriber data traffic 31. In an embodiment, correlation module 36 may search mapping table 39 for a network address that matches the network address associated with the detected network event and/or session. Either one or both of the source and destination network addresses from Netflow data 48 may be used to search mapping table 39. If a matching network address is found, then the subscriber device information that is mapped to the matching network address is correlated to the detected network session/event and is profiled based on network behavior. Accordingly, correlation module 36 may retrieve the correlated subscriber device information from mapping table 39. In an embodiment, correlation module 36 can then provide the matched network address, the subscriber device information, and the network event information to management console 40. Such information may be provided via an automatic correlation feed and may, in some scenarios, include an alert to one or more email addresses, phone numbers, computers, or other devices.

Management console 40 can include a user interface 42 and event database 46. A wireless operator could view a display, via user interface 42, in which subscriber visualization dashboard 55 can be drilled down based on any of the associated subscriber device information. For example, a display might be selected to show all of the network events for a particular mobile phone number (e.g., based on MSISDN), for a particular type of manufacturer (e.g., based on a portion of the IMEI identifying the manufacturer), for a particular SIM card (e.g., based on IMSI), or for a particular access point (e.g., based on APN). Thus, it is possible to determine, among other things, which subscriber devices have accessed which websites and for the length of time spent on those websites, identification of malware files including applications downloaded on to the mobile device, characterization of http traffic from the mobile device, URL access patterns, risk, category and time of access, risk profiles of the subscriber user or the mobile device based on network events, applications used by mobile device, with bandwidth consumption for each application, top bandwidth consumers among subscribers, identifying communication of mobile devices with any particular websites, and which phone numbers have been responsible for any outgoing attacks, etc. Moreover, a mobile service provider can leverage information received via management console 40 to generate behavior profiles 50.

Behavior analysis module 41 may take network event information correlated to subscriber devices by correlations module 36 and generate behavior profiles 50. Behavior profiles 50 may include information such as URL access per subscriber, risk and category of the URL via Global Reputation Intelligence, attacks sent and received from the subscriber mobile device, application usage per subscriber for different applications of the mobile device, application downloaded per subscriber, bandwidth consumed per subscriber and overall per application, risk score of the subscriber (based on URL reputation, apps downloaded, attacks detected), violations report (parental control rules, for example), etc. Global reputation Intelligence is a database of IP addresses and URLs and their reputation (malicious/benign) on the Internet.

Behavior analysis module 41 may include a reporting module 44. In an example embodiment, management console 40 can store the network event information and the correlated subscriber device information in event database 46. Reporting module 44 can be configured to allow visibility into event database 46 and/or to provide behavior profiles 50 to the mobile service provider or subscriber based on the event information and/or the subscriber device information.

Figure 3:
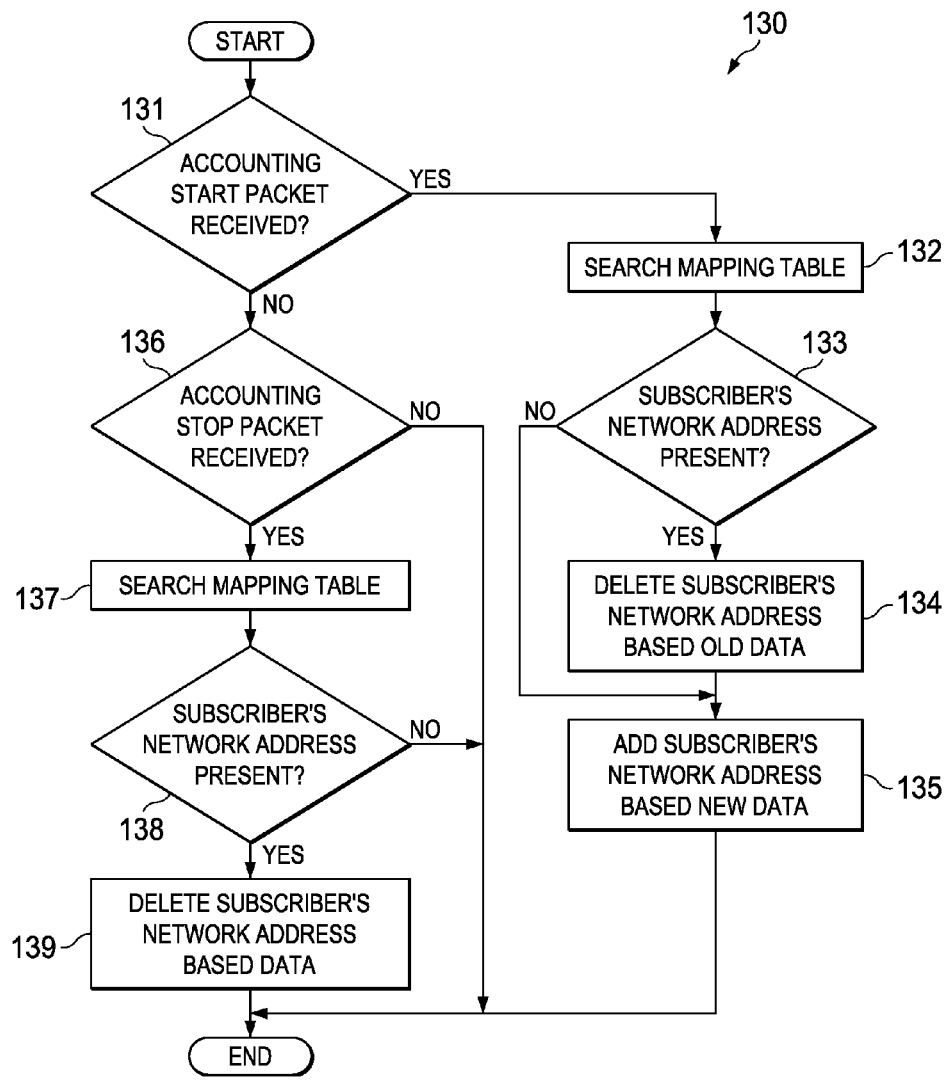
FIG. 3 is a simplified flowchart illustrating potential operations that may be associated with the communication system in accordance with an embodiment.

Turning to FIG. 3, a flowchart illustrates an example flow 130 that may be associated with communication system 10 for correlating network events with subscriber information in a mobile network environment. In an embodiment, flow 130 represents one or more activities performed by extraction/parser module 9 in deep Netflow inspection engine 7 of network threat behavior analysis engine 6.

Flow 130 may begin at 131, where a determination is made as to whether an accounting start packet is received. An accounting start packet may be received from AAA server 22. If an accounting start packet has been received, then mapping table 39 may be searched at 132 for a network address that matches a network address of the accounting start packet. If it is determined at 133 that a matching network address is present in mapping table 39, then at 134, the network address and associated subscriber device information are deleted from mapping table 39. At 135, the network address of accounting start packet and its associated subscriber device information may be added to mapping table 39. With reference again to 133, if it is determined that a matching network address is not present in mapping table 39, then at 135, the network address of accounting start packet and its associated subscriber device information may be added to mapping table 39. Once these updates are made for the accounting start packet, flow 130 may end.

If it is determined at 131 that an accounting start packet has not been received, then at 136, a determination is made as to whether an accounting stop packet is received. If an accounting stop packet has also not been received, then flow 130 may end because there are no updates needed to database 38.

If it is determined at 136 that an accounting stop packet has been received, then at 137, mapping table 39 may be searched for a network address that matches a network address of the accounting stop packet. If it is determined at 138 that a matching network address is not present in mapping table 39, then flow 130 may end without any updates to database 38. However, if it is determined at 138 that a matching network address is present in mapping table 39, then at 139, the network address and any associated subscriber device information is deleted from mapping table 39, and flow 130 may end.

Turning to FIG. 4, a flowchart illustrates an example flow 400 that may be associated with communication system 10 for correlating network events with subscriber information in a mobile network environment. In an embodiment, flow 400 represents one or more activities performed by correlation module 36 in network threat behavior analysis engine 6.

Flow 400 may begin at 141, where network event data 37 is received. Network event data 37 can include network event information. The network event information represents a network event detected in subscriber data traffic 31. The network event was detected by deep Netflow inspection engine 7 after receiving subscriber data traffic 31. Network event data 37 can also include either one or both of a source network address and destination network address from subscriber data traffic 31. At 142, mapping table 39 may be searched for a network address that matches the network address associated with the detected network event. In an embodiment, mapping table 39 may be searched using either one or both of the source network address and the destination network address associated with the detected network event. If it is determined at 143 that a matching network address is not present in mapping table 39, then at 146, a log is made that a subscriber was not found and a summary of unresolved subscriber flows is sent to management console 40. In one or more other embodiments, the network event information and the network address may also be provided to management console 40, and flow 400 may end.

However, if it is determined at 143 that a matching network address is present in mapping table 39, then at 144, the subscriber device information mapped to the network address may be extracted from mapping table 39. The subscriber device information may be added to the subscriber's behavior profile. At 145, subscriber reports, anomalies, and on-demand statistics may be provided to management console 40. These different items may be found in the subscriber's behavior profile. The network event information, the network address of the associated subscriber device, and the subscriber device information extracted from mapping table 39 may be also be provided to management console 40. Additionally, identification of malware files including applications downloaded on to the mobile device; characterization of http traffic from mobile device, such as URL access patterns, risk, category, and time of access; risk profile of the subscriber or the mobile device based on security events; applications used by mobile device (Netflix, Facebook chat, Google talk, Salesforce, p2p etc.), with bandwidth consumption; top bandwidth consumers among subscribers; and identifying communication of mobile device with risky sites may also be provided to management console 40. Once the information is sent to management console 40, flow 400 may end.

FIG. 5 is a block diagram illustrating one example of where data may be processed and maintained in communication system 10. Network security platform 30 can have a control plane 51 and a data plane 52. Subscriber accounting traffic 33 is received in data plane 52. Network security platform 30 sends information 57 to network threat behavior analysis engine 6. Information 57 may be Netflow plus metadata. Deep Netflow inspection engine 7 extracts subscriber device information from information 57. Mapping table 39 in database 38 can be populated and maintained from data received in control plane 51. Correlation module 36 may receive subscriber netflow records with application metadata from deep packet inspection engine 32 and use mapping table 39 to profile the subscribers using their device address. Management console 40 can include a subscriber visualization dashboard 55 to display subscriber device information along with associated network event information and behavior profiles 50, which are received from control plane 51 of network security platform 30.

Figure 6:
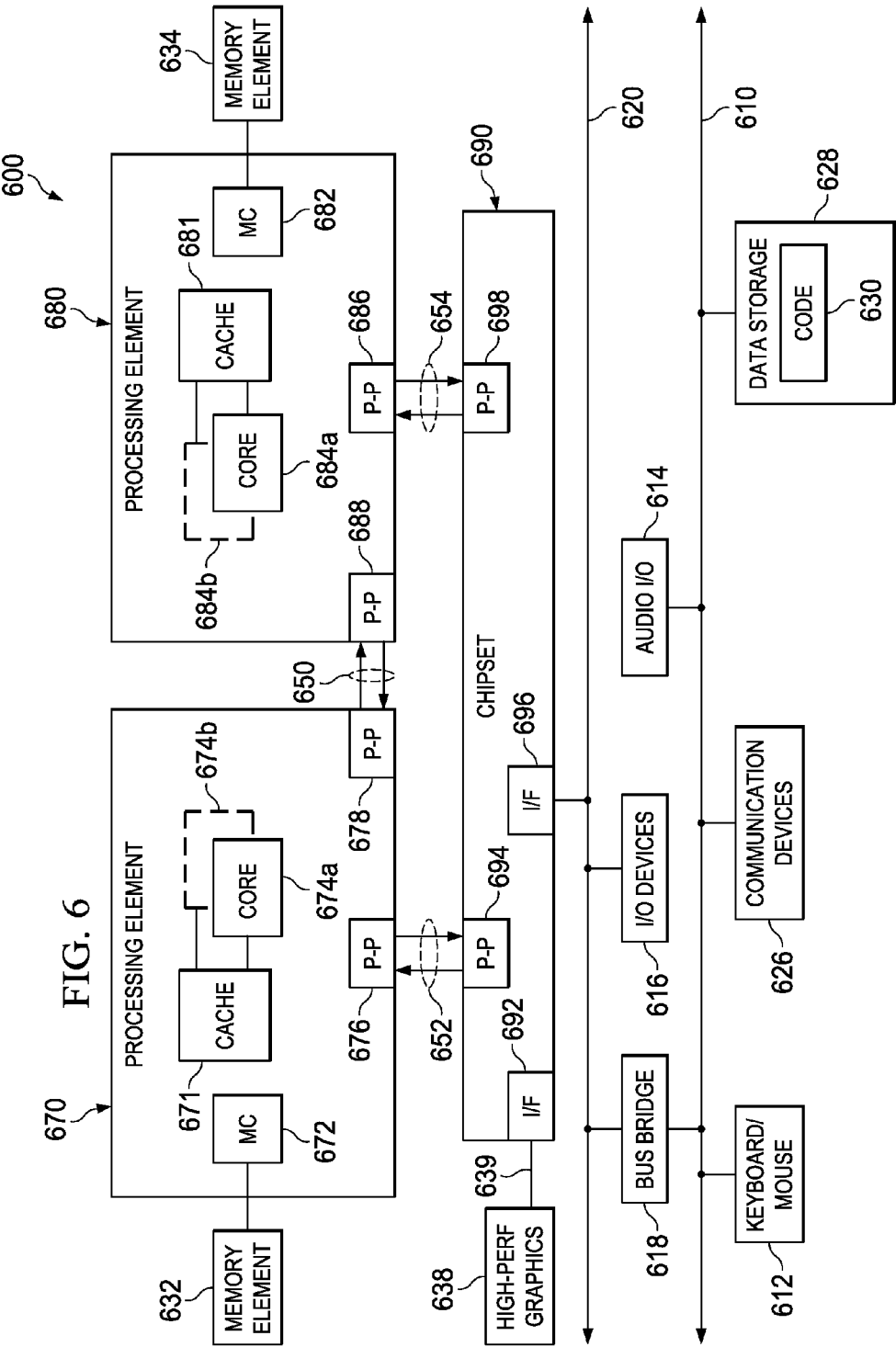
FIG. 6 is a block diagram illustrating a computing system that is arranged in a point-to-point configuration according to an embodiment.

FIG. 6 illustrates a computing system 600 that is arranged in a point-to-point (PtP) configuration according to an embodiment. In particular, FIG. 6 shows a system where processors, memory, and input/output devices are interconnected by a number of point-to-point interfaces. Generally, network elements of communication system 10 may be configured in the same or similar manner as computing system 600. For example network security platform 30 and management console 40, as described herein, may each be a computing system, such as exemplary computing system 600.

As illustrated in FIG. 6, system 600 may include several processing elements, of which only two processing elements 670 and 680 are shown for clarity. While only two processing elements 670 and 680 are shown, it is to be understood that an embodiment of system 600 may also include only one such processing element. Processing elements 670 and 680 may each include a processor core 674a and 684a to execute multiple threads of a program. Processors 670 and 680 may also each include integrated memory controller logic (MC) 672 and 682 to communicate with memory elements 632 and 634. The memory elements 632 and/or 634 may store various data. In alternative embodiments, memory controller logic 672 and 682 may be discrete logic separate from processing elements 670 and 680.

Processing elements 670 and 680 may be any type of a processing element (also referred to herein as 'processor'). Processing elements 670 and 680 may exchange data via a point-to-point (PtP) interface 650 using point-to-point interface circuits 678 and 688, respectively. Processing elements 670 and 680 may each exchange data with a chipset 690 via individual point-to-point interfaces 622 and 624 using point-to-point interface circuits 676, 686, 694, and 698. Chipset 690 may also exchange data with a high-performance graphics circuit 638 via a high-performance graphics interface 639, using an interface circuit 692, which could be a PtP interface circuit. In alternative embodiments, any or all of the PtP links illustrated in FIG. 6 could be implemented as a multi-drop bus rather than a PtP link.

As shown in FIG. 6, each of processing elements 670 and 680 may be multicore processors, including first and second processor cores (i.e., processor cores 674a and 674b and processor cores 684a and 684b). Such cores may be configured to execute instruction code in a manner similar to that discussed above with reference to FIGS. 2-5. Each processing element 670, 680 may include at least one shared cache 696. Shared cache 671, 681 may store data (e.g., instructions) that are utilized by one or more components of processing elements 670, 680, such as cores 674a, 674b, 684a, and 684b.

Chipset 690 may be in communication with a bus 620 via an interface circuit 696. Bus 616 may have one or more devices that communicate over it, such as a bus bridge 618 and I/O devices 616. Via a bus 610, bus bridge 618 may be in communication with other devices such as a keyboard/mouse 612 (or other input device such as a touch screen, trackball, etc.), communication devices 626 (such as modems, network interface devices, or other types of communication devices that may communicate through a computer network), audio I/O devices 614, and/or a data storage device 628. Data storage device 628 may store code 630 that may be executed by processing elements 670 and/or 680. In alternative embodiments, any portions of the bus architectures could be implemented with one or more PtP links.

In one example implementation, network elements of communication system 10 may include software in order to achieve the correlating activities outlined herein. These activities can be facilitated by various modules (e.g., deep Netflow inspection engine 7, extraction/parser module 9, correlation module 36, user interface 42, reporting module 44, etc.), which can be suitably combined in any appropriate manner, and which may be based on particular configuration and/or provisioning needs. In other embodiments, these correlating activities may be executed externally to these elements, or included in some other network element to achieve this intended functionality. In still other embodiments, the elements in communication system 10 may include this software (or reciprocating software) that can coordinate with other network elements in order to achieve the operations, as outlined herein. Furthermore, the modules can be implemented as software, hardware, firmware, or any suitable combination thereof.

Note that in certain example implementations, the correlating activities outlined herein may be implemented by logic encoded in one or more tangible, non-transitory media (e.g., embedded logic provided in an application specific integrated circuit (ASIC), digital signal processor (DSP) instructions, software (potentially inclusive of object code and source code) to be executed by a processor (e.g., processing elements 670, 680), or other similar machine, etc.). In some of these instances, one or more memory elements (as shown in FIG. 6) can store data used for the operations described herein. This includes the memory element being able to store software, logic, code, or processor instructions that are executed to carry out the activities described in this Specification.

A processor (as shown in FIG. 6) can execute any type of instructions associated with the data to achieve the operations detailed herein in this Specification. In one example, a processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof. Any of the potential processing elements, modules, and machines described in this Specification should be construed as being encompassed within the broad term 'processor.'

The network elements in communication system 10 may further keep information, to be used in achieving the correlating activities as discussed herein, in any suitable memory element (random access memory (RAM), read only memory (ROM), EPROM, EEPROM, ASIC, etc.), software, hardware, or in any other suitable component, device, element, or object where appropriate and based on particular needs. Moreover, the information being used, tracked, sent, or received in communication system 10 could be provided in any database, register, queue, table, cache, or other storage structure, all of which can be provided in any suitable timeframe. Any of the memory items or storage options may be included within the broad term 'memory element' as used herein.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 10 and its teachings are readily scalable and can accommodate a large number of components, as well as more compli- cated/sophisticated arrangements and configurations. Accordingly, the examples provided should not limit the scope or inhibit the broad teachings of communication system 10 as potentially applied to a myriad of other architectures.

It is also important to note that the steps in the preceding flow diagrams illustrate only some of the possible correlating scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. For example, management console 40 may be integrated with network security platform 30 or network behavior threat analysis engine 6. Data storage elements may also be combined. Additionally, although communication system 10 has been illustrated with reference to particular elements and operations that facilitate the communication process, these elements and operations may be replaced by any suitable architecture, protocols, and/or processes that achieve the intended functionality of communication system 10.

What is claimed is:

1. A method comprising:
   receiving, at an out of band network threat behavior analysis engine, a plurality of records containing information related to network traffic associated with a network connection between a packet data network and a subscriber device of a plurality of subscriber devices in a mobile network, wherein the information is to include a network address and application metadata of at least one application used by the subscriber device, wherein the network traffic is intercepted by a network security device that generates the plurality of records;
   extracting at least some of the application metadata from the plurality of records;
   correlating the information with a mobile telephone number of the subscriber device based on the network address from the information being mapped to subscriber device information of the subscriber device in a memory element that maps subscriber device information of authenticated subscriber devices in the mobile network to real-time network addresses of the authenticated subscriber devices; and generating a network behavior profile for the subscriber device based, at least in part, on the extracted application metadata, wherein the network behavior profile is to include a characterization of network traffic sent by the subscriber device, an identification of one or more applications used by the subscriber device, and an identification of communications by the subscriber device to one or more websites.

2. The method of claim 1, wherein the information is at least two of transport layer information, application layer information, and network layer information.

3. The method of claim 2, wherein generating the network behavior profile comprises: correlating the application layer information with the transport layer and network layer information to form a risk profile and an application profile for the subscriber device.

4. The method of claim 1, further comprising:
receiving an authentication for the subscriber device entering the mobile network;
determining whether an Internet Protocol (IP) address of the subscriber device is present in the memory element;
responsive to the IP address being present, removing previous subscriber association with the IP address from the memory element; and
correlating the subscriber device information of the subscriber device with the IP address in the memory element.

5. The method of claim 1, further comprising:
receiving an authentication for the subscriber device leaving the mobile network;
determining whether an Internet Protocol (IP) address of the subscriber device is present in the memory element; and
responsive to the IP address being present, removing previous information associated with the IP address from the memory element.

6. One or more non-transitory computer-readable media that includes code for execution and when executed by a processor is operable to perform operations comprising:
receiving, at an out of band network threat behavior analysis engine, a plurality of records containing information related to network traffic associated with a network connection between a packet data network and a subscriber device of a plurality of subscriber devices in a mobile network, wherein the information is to include a network address and application metadata of at least one application used by the subscriber device, wherein the network traffic is intercepted by a network security device that generates the plurality of records;
extracting at least some of the application metadata from the plurality of records;
correlating the information with a mobile telephone number of the subscriber device based on the network address from the information being mapped to subscriber device information of the subscriber device in a memory element that maps subscriber device information of authenticated subscriber devices in the mobile network to real-time network addresses of the authenticated subscriber devices; and
generating a network behavior profile for the subscriber device based, at least in part, on the extracted application metadata, wherein the network behavior profile is to include a characterization of network traffic sent by the subscriber device, an identification of one or more applications used by the subscriber device, and an identification of communications by the subscriber device to one or more websites.

7. The one or more non-transitory computer-readable media of claim 6, wherein the information is at least two of transport layer information, application layer information, and network layer information.

8. The one or more non-transitory computer-readable media of claim 6, wherein the processor is operable to perform further operations comprising:
receiving an authentication for the subscriber device entering the mobile network;
determining whether an Internet Protocol (IP) address of the subscriber device is present in the memory element;
responsive to the IP address being present, removing previous subscriber association with the IP address from the memory element; and
correlating the subscriber device information of the subscriber device with the IP address in the memory element.

9. The one or more non-transitory computer-readable media of claim 6, wherein the processor is operable to perform further operations comprising:
receiving an authentication for the subscriber device leaving the mobile network;
determining whether an Internet Protocol (IP) address of the subscriber device is present in the memory element; and
responsive to the IP address being present, removing previous information associated with the IP address from the memory element.

10. The one or more non-transitory computer-readable media of claim 6, wherein the network behavior profile is to include one or more of application usage of the one or more applications used by the subscriber device, identification of any applications downloaded by the subscriber device, bandwidth consumed by the subscriber device, and bandwidth consumed by the subscriber device per application.

11. The one or more non-transitory computer-readable media of claim 6, wherein the network behavior profile is to include an identification of any attacks sent by the subscriber device and an identification of any attacks received by the subscriber device.

12. The one or more non-transitory computer-readable media of claim 6, wherein the subscriber device information is to include at least one of an International Mobile Equipment Identity (IMEI), an International Mobile Subscriber Identity (IMSI), a Mobile Station International Subscriber Directory Number (MSISDN), and an access point name (APN).

13. The one or more non-transitory computer-readable media of claim 6, wherein the mobile telephone number of the subscriber device is a Mobile Station International Subscriber Directory Number (MSISDN).

14. An apparatus, comprising:
a memory element configured to store data;
a hardware processor operable to execute instructions associated with the data;
an out of band network threat behavior analysis engine configured to interface with the memory element and the hardware processor to:
receive a plurality of records containing information related to network traffic associated with a network connection between a packet data network and a subscriber device of a plurality of subscriber devices in a mobile network, the information to include a network address and application metadata of at least one application used by the subscriber device, wherein the network traffic is intercepted by a network security device that generates the plurality of records;
extract at least some of the application metadata from the plurality of records;
and
generate a network behavior profile for the subscriber device based, at least in part on the extracted application metadata, wherein the network behavior profile is to include a characterization of network traffic sent by the subscriber device, an identification of one or more applications used by the subscriber device, and an identification of communications by the subscriber device to one or more websites; and a correlation module configured to interface with the memory element and the hardware processor to correlate the information with a mobile telephone number of the subscriber device based on the network address from the information being mapped to subscriber device information of the subscriber device in a memory element that maps subscriber device information of authenticated subscriber devices in the mobile network to real-time network addresses of the authenticated subscriber devices.

15. The apparatus of claim 14, further comprising:
the network security device, wherein the network security device is configured to:
identify the information in the network traffic; and
send the plurality of records containing the information to the network threat behavior analysis engine.

16. The apparatus of claim 14, wherein the network threat behavior analysis engine is configured to:
receive an authentication for the subscriber device entering the mobile network;
determine whether an Internet Protocol (IP) address of the subscriber device is present in the memory element;
responsive to the IP address being present, remove previous subscriber association with the IP address from the memory element; and
correlate the subscriber device information of the subscriber device with the IP address in the memory element.

17. The apparatus of claim 14, further comprising:
the network threat behavior analysis engine configured to:
receive an authentication for the subscriber device leaving the mobile network;
determine whether an Internet Protocol (IP) address of the subscriber device is present in the memory element; and
responsive to the IP address being present, remove previous information associated with the IP address from the memory element.

18. The apparatus of claim 14, wherein the information is to include at least two of transport layer information, application layer information, and network layer information.

* * * * *